May 12, 1931.                D. B. BROOKS                1,805,388
                           FREIGHT CAR PUSHER
                          Filed Sept. 16, 1929
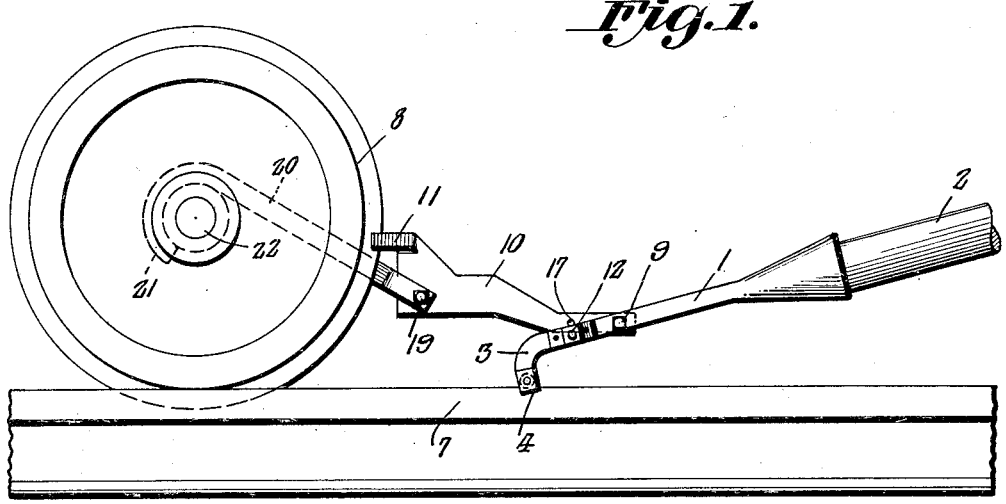
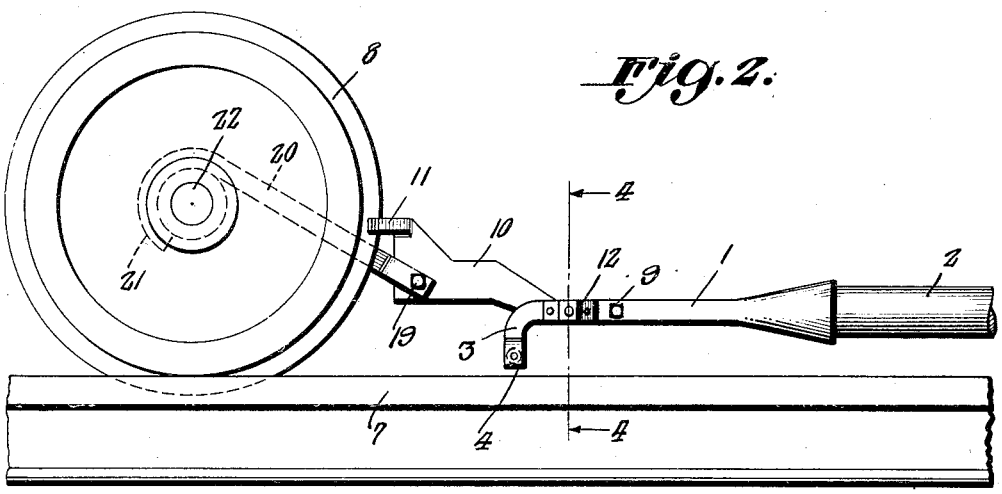
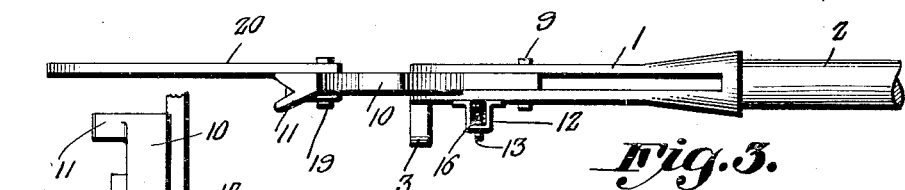
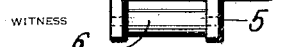
Desmond B. Brooks,
INVENTOR
BY Victor J. Evans
ATTORNEY Patented May 12, 1931

1,805,388

UNITED STATES PATENT OFFICE

DESMOND B. BROOKS, OF HAXTUN, COLORADO

FREIGHT CAR PUSHER

Application filed September 16, 1929. Serial No. 392,985.

My present invention has reference to a simple, cheaply constructed, strong and efficient device for imparting an initial movement to standing freight or other cars.

A further object is the provision of a device for this purpose that includes a lever, a wheel engaging jaw and an axle engaging hook all of which are pivotally associated but the connection between the jaw and handle being such that the outer and rounded end of the lever may be brought to contact with the rail on which the wheel of the car is positioned, and thus serve as a fulcrum element to assist the jaw in imparting an initial turning to the wheel, said lever when moved to one postion is automatically latched to and forms a part of the jaw, while the vertical reciprocation of the handle will cause the jaw to contact with and to move off of the rim of the wheel and thereby push the wheel to move the car to any desired position on the track.

To the attainment of the foregoing the invention consists in certain other novel features of construction, combination and operative association of parts, one satisfactory embodiment of which is disclosed by the accompanying drawings.

In the drawings:

Figure 1 is a side elevation showing the manner in which the handle is employed as a fulcrum when the jaw engages the rim of the car wheel, the hook being arranged over the axle of the wheel.

Figure 2 is a similar view but showing the handle latched to the jaw.

Figure 3 is a top plan view of the device.

Figure 4 is a greatly enlarged sectional view on the line 4—4 of Figure 2.

The element, which I will hereinafter refer to as the lever, is indicated by the numeral 1, the same having a socket end for the reception of a pole or handle, indicated by the numeral 2. The lever 1 is in the nature of a bifurcated member and, at its outer end is formed with an offset downwardly extending portion 3 whose extremity is formed with a substantially U-shaped offset part 4, the inner depending wall of the said U-shaped part being in a line with the outer element of the bifurcated lever 1. There is pivotally secured between the inner and outer end depending portions 5 of the said offset portion 3 the trunnions of a roller 6 and this roller is designed to contact with a rail 7 on which the wheel 8 of a car to be moved is positioned.

Above the rounded end 3 there is pivoted, as at 9, in the bifurcated portion of the handle 1 a shank 10 on whose upper and stepped portion there is formed an outwardly directed subtantially V-shaped jaw 11. On the outer side of the bifurcated handle 1 there is fixed a substantially U-shaped cage 12 through the outer end of which there passes a stem 13 that carries on its inner end a dog 14, the outer or active end of this dog being cut angularly, as at 15. A spring 16 surrounds the shank and contacts between the outer end of the dog and the outer end of the yoke-like cage 12. The stem 10 of the jaw 11 is provided with a socket portion 17 into which the dog is movable, and the dog has inserted therethruogh a pin 18 for limiting the movement of the said dog in the said socket.

There is pivoted, as at 19, to the shank 10, below the jaw 11 one end of a rod 20 whose second and free end is hooked, as at 21, and this hook is designed to be arranged over the axle 22 for the wheel 8.

Initially the parts are in the position disclosed by Figure 1, that is, the dog is out of the socket 17 and the handle is swung on the shank 10 so that the roller 6 will contact with the tread surface of the rail 7, the hook 21 being arranged over the axle and the jaw 11 being in engagement with the rim of the wheel 8. An upward pull upon the pole 2 of the lever 1 will cause the pole to act as a fulcrum and will raise the shank and the dog carried thereby so that the wheel will be imparted an initial starting and turning movement. When the wheel has been thus moved a sufficient distance as to insure the further turning thereof by the contact of the jaw, the handle is swung in alinement with the pivoted end of the shank 10 and the dog 14 enters the socket 17 of the shank thereby locking the handle to the jaw, and permitting the handle to be moved with the jaw to impart a further turning to the wheel, the hook 21, of course, being at all times arranged around the axle of the wheel 8 when the car to which the wheel is attached is being pushed.

Having described the invention, I claim:

1. In a device for the purpose set forth, a lever having a downturned and offset end providing a rail engaging fulcrum, a jaw having a shank pivoted to the lever, and said jaw being bifurcated to engage with the rim of the wheel and a hooked element pivotally secured to the shank of the jaw and designed to be arranged over the axle of the wheel.

2. In a device for the purpose set forth, a lever having a downturned and offset end providing a rail engaging fulcrum, a jaw having a shank pivoted to the lever, and said jaw being bifurcated to engage with the rim of the wheel and a hooked element pivotally secured to the shank of the jaw and designed to be arranged over the axle of the wheel and means for automatically locking the lever to the shank of the jaw when the lever is swung to one position.

3. In a device for the purpose set forth, a lever having a downturned and offset end providing a rail engaging fulcrum, a jaw having a shank pivoted to the lever, and said jaw being bifurcated to engage with the rim of the wheel and a hooked element pivotally secured to the shank of the jaw and designed to be arranged over the axle of the wheel, means for automatically locking the lever to the shank of the jaw when the lever is swung to one position, said means including a spring pressed dog arranged along one side of the lever and the shank having a socket to receive said dog.

4. In a car wheel pushing device, a bifurcated lever having a socket end for the reception of a handle and its second end rounded and formed with a bifurcated offset portion, a wheel journaled in said bifurcated portion to engage with a rail on which the wheel rests, a shank pivotally secured in the bifurcated portion of the lever, said shank having an upstanding portion provided with an offset end which is formed with a V-shaped notch to provide the same with a rail rim gripping jaw, a bar pivotally secured to the shank and having a hooked end to be arranged over the axle of the wheel, a substantially U-shaped cage on one side of the lever, a spring influenced dog guided therethrough and through the said side of the lever and the shank having a socket to receive the dog when the lever is swung to one position with respect to the shank.

In testimony whereof I affix my signature.

DESMOND B. BROOKS.